Nov. 19, 1968  T. F. LIERMANN  3,411,342
APPARATUS FOR CONTINUOUSLY MEASURING OPTICALLY ACTIVE MATERIALS
Filed June 8, 1966
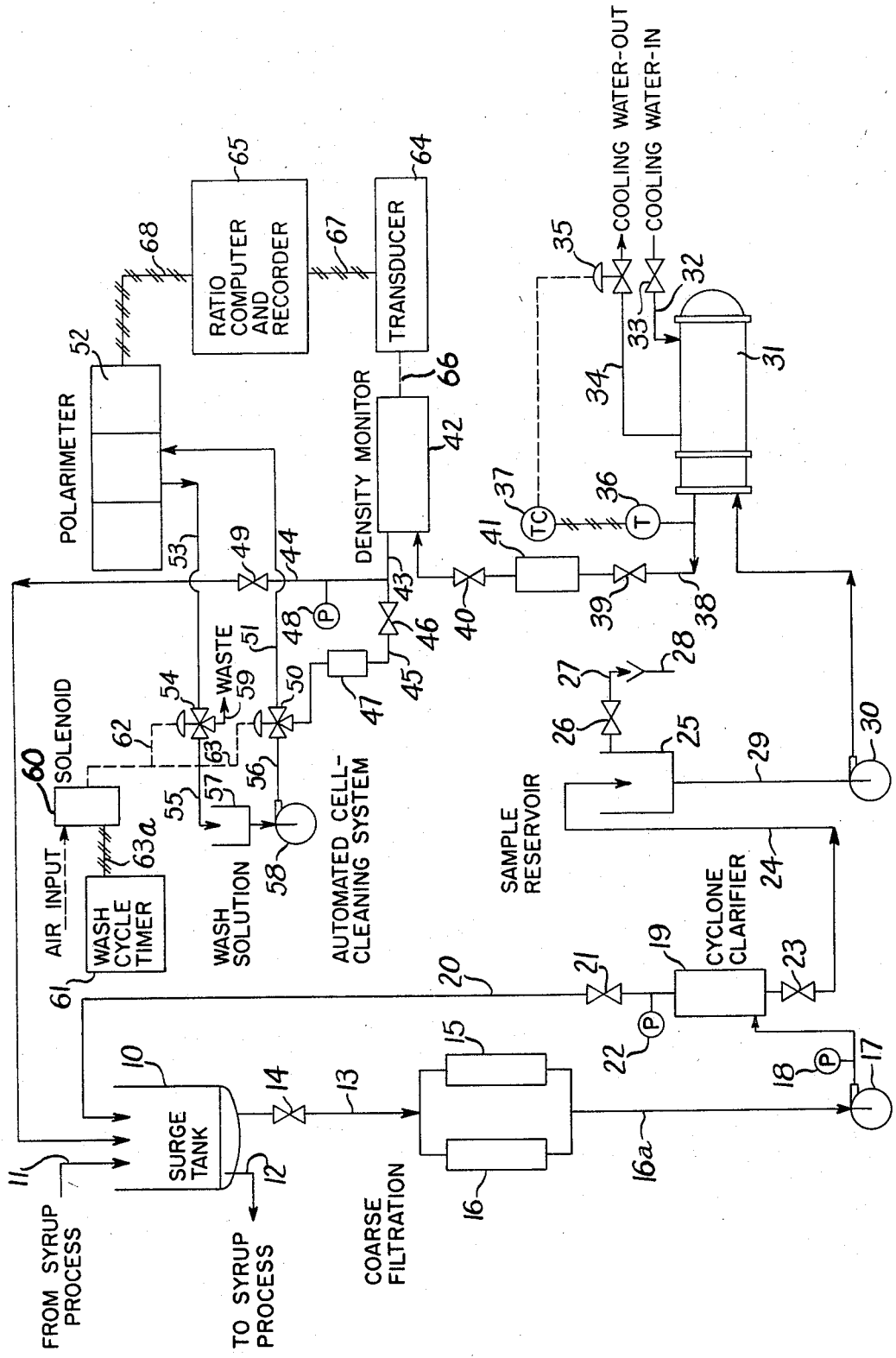

United States Patent Office 3,411,342
Patented Nov. 19, 1968

3,411,342
APPARATUS FOR CONTINUOUSLY MEASURING OPTICALLY ACTIVE MATERIALS
Theodore F. Liermann, Decatur, Ill., assignor to A. E. Staley Manufacturing Company, Decatur, Ill., a corporation of Delaware
Filed June 8, 1966, Ser. No. 556,059
10 Claims. (Cl. 73—53)

ABSTRACT OF THE DISCLOSURE

A continuous determination of the concentration of an optically active material in a solution can be obtained by introducing a solution of the optically active material through an apparatus comprising a density measuring means and a polarimeter both adapted to provide an electrical response which, when introduced into a computation means, will produce a response which is equivalent to the concentration of the optically active material.

---

This invention is directed to an apparatus and method for determining the concentration of an optically active material in a solution on a continuous basis. More specifically, this invention is directed to an apparatus and method for continuously monitoring and measuring the dextrose equivalent (D.E.) of a starch hydrolyzate.

The capability of measuring or monitoring the concentration of an optically active reaction produce or reactant on an instantaneous and contiuous basis is of great importance to many industrial operations. This capability is of particular importance in processes where the rate or degree of reaction determines the grade or composition of the final product.

In the corn wet-milling industry, for example, the rate or degree of starch hydrolysis is important when a syrup of a particular sugar concentration is desired. The criterion employed by the corn wet-milling industry for determining the rate or degree of starch hydrolysis is the dextrose equivalent (D.E.).

For purposes of this invention the dextrose equivalent (D.E.) is defined as the measure of the reducing-sugar content of a solution calculated as dextrose and expressed as a percentage of the total dry substance.

Although there are many chemical and physical test methods reported in the literature for determining the equivalent sugar content of a solution, none of these methods is capable of reporting the equivalent sugar content of a solution on a continuous and instantaneous basis.

It is accordingly an object of this invention to provide an apparatus and method for measuring, on a continuous and instantaneous basis, the concentration of an optically active material as this material is being consumed or produced.

Another object of this invention is to provide an apparatus and method that is capable of determining sugar equivalent values of sugar solutions based on the optical rotation and density of the solutions.

Still another object of this invention is to provide an apparatus and method for measuring the D.E. values of crude and refined starch hydrolyzates on an instantaneous and continuous basis.

Other objects of this invention include: providing a means for circulating a sample stream which is representative of the syrup being processed; adjusting the temperature of the stream to a predetermined value; continuously measuring the specific gravity of the stream and providing a signal or response that varies as the specific gravity varies and is proportional thereto; filtering a portion of the stream to make it optically clear; continuously measuring the optical rotation of the filtered portion and providing another signal or response that varies as the optical rotation varies and is proportional thereto; combining the two signals or responses to provide a continuous indication of the D.E. of the stream; and automatically washing the cell used for measuring the optical rotation.

Other obvious features and advantages of this invention will be more readily apparent from the description and illustration which follows wherein the accompanying illustration diagrammatically shows one suitable apparatus and process embodying this invention.

Surge tank 10 is connected to lines 11 and 12 which continuously circulate syrup from a syrup process unit (not shown) to the surge tank. Parallel filters 15 and 16, which may be used alternately or together, are connected to surge tank 10 by line 13 having throttle valve 14 and by line 16a having a pressure gauge 18 through pump 17 to the cyclone clarifier 19. Line 20 having throttle valve 21 and pressure gauge 22 connects cyclone clarifier 19 to surge tank 10. Sample reservoir 25 is joined with cyclone clarifier 19 through line 24 having throttle valve 23. The overflow from sample reservoir 25 is carried through line 27 and throttle valve 26 to line 28.

Heat exchanger 31 is connected to the sample reservoir 25 by line 29 through pump 30 for pumping from sample reservoir to the heat exchanger. Cooling water is circulated through heat exchanger 31 by line 32 through throttle valve 33 and line 34 through pressure control valve 35. A thermocouple 36 is connected into line 38 and electrically connected to a temperature control 37 which, in turn, is operatively connected to pressure control valve 35 to regulate the flow of cooling water and maintain a predetermined temperature of the flow in line 38.

Flow through line 38 into density monitor 42 is controlled by check valves 39 and 40 and is monitored by flow meter 41. Line 43 coming from density monitor 42 is split into line 44 and line 45. Line 44, leading to surge tank 10, has a pressure gauge 48 and a throttle valve 49. Line 45 has a throttle valve 46, flow meter 47 and 3-way valve 50 in series. Polarimeter 52 is connected to 3-way pressure valve 50 and through line 51. The desired flow to polarimeter 52, which is substantially less than the flow through density monitor 42, is regulated by adjustment of the throttle valves 49 and 46 and metered through flow meter 47. Flow from polarimeter 52 goes to waste through line 53, 3-way pressure valve 54 and line 59.

Wash solution tank 57 is connected to 3-way pressure valve 54 by line 55 and is connected to 3-way valve 50 by line 56 through pump 58. Pump 58 is used to periodically circulate the wash solution from tank 57 to polarimeter 52. Under normal operation, the 3-way valves are positioned to permit flow through line 45, valve 50 line 51, polarimeter 52, line 53 and line 59. The 3-way pressure valves 50 and 54 are connected to solenoid 60 by air-pressure lines 62 and 63 and are actuated by wash cycle timer 61. The timer 61 is electrically connected to solenoid 60 by electric line 63a. During the wash cycle, lines 45 and 59 are closed off by valves 54 and 50 and lines 56, 51, 53 and 55 are opened completing the circuit between the polarimeter and the wash solution tank.

An output voltage is transmitted from polarimeter 52 to ratio computer and recorder 65 through electrical line 68, an air pressure output signal from density monitor 42 is sent to transducer 64 by pressure line 66, where it is converted to a voltage signal and transmitted to ratio recorder 65 by electrical line 67. One suitable ratio recorder that has been used satisfactorily is a Phoenix ratio recorder manufactured by the Phoenix Precision Instrument Co.

The density monitor 42 is a force-balance density monitor of conventional construction. Satisfactory specific gravity measurements, on a continuous basis, have been obtained using a Halliburton Model B–2A density monitor manufactured by the Halliburton Company. This instrument can be adjusted to report a specific gravity range of 0.100 specific gravity units. This range permits an accuracy of density measurement equivalent to ±0.001 specific gravity units. This degree of sensitivity was found satisfactory for obtaining the specific gravity of solutions having a dry substance level of between 30–40%.

A satisfactory polarimeter 52 is a Du Pont Model 420 process polarimeter. It can be adjusted to monitor the optical rotation over a range of 0–18.0° arc which is suitable for monitoring the optical rotation of 0–80% d.s. syrup solutions. Using this instrument, it is possible, for example, to characterize the D.E. of a 30–40% d.s. syrup solution within ±1.5 D.E. on a continuous basis.

In operation a continuous flow of crude starch syrup obtained from a starch hydrolyzation process is passed through line 11 to surge tank 10. A portion of the accumulated crude syrup is continuously withdrawn from the surge tank through line 13 and check valve 14 and passed through filters 15 and 16 for removing large foreign particles from the syrup. The filters may be used alternately, if one of the filters has to be replaced, or in combination. Pump 17 circulates the syrup from the filters through line 16a and pressure gauge 18 through a cyclone clarifier 19. The cyclone clarifier removes the smaller interferring particles which passed through filters 15 and 16. Gauges 18 and 22 are provided for indicating the input and output pressures to and from the cyclone clarifier. A clarified stream from the cyclone clarifier flows into a sample reservoir 25 through conduit 24 containing a throttle valve 23 for controlling the rate of flow therethrough. The heavy portion of the clarified stream is returned to the surge tank through line 20 having throttle valve 21 and pressure gauge 22 in series therewith.

A sample stream is continuously circulated from the sample reservoir 25 through line 29 by a circulating pump 30, causing the sample stream to flow through a heat exchanger 31 of known type. The heat exchanger is supplied with cooling water through line 32 having a volume control valve 33 to reduce the temperature of the sample stream to a predetermined temperature. The temperature control for the heat exchanger includes an indicating thermocouple 36 and temperature controller means 37 of known type which actuates a pressure control valve 35 in the exit stream 34 from the heat exchanger to regulate the flow of cooling water as required.

The sample stream then passes through line 38 having in series valve 39, a flow meter 41, valve 40, and thence through a density monitor 42 of known type which provides an output air pressure response or signal that is a function of the specific gravity of the sample stream. The sample stream then passes through line 43 where it is split into lines 44 and 45. The portion passing through line 45 goes through valve 46, a flow meter 47, a 3-way valve 50, and thence through a polarimeter 52. The polarimeter measurement is reported as an electrical output signal or response such as a voltage ranging, for example, from 0–10 millivolts, such response being a function of the optical rotation of the sample stream. The portion of the sample stream passing through the polarimeter is passed to waste through line 53 and 59 and another 3-way valve 54. A bypass line 44, having in it a pressure gauge 48 and a throttle valve 49, is arranged to return to the surge tank 10 any excess of the sample stream not required for passage through the polarimeter since the density monitor generally requires a larger volume of liquid than the polarimeter.

In order to provide a continuous indication and record of the D.E. of the sample stream, the output voltage of polarimeter 52 is applied to a ratio computer and recorder 65 through line 68. The air-pressure output signal of the density monitor 42 is converted to a voltage signal by a transducer 64 through pressure line 66. This voltage is also applied to the ratio computer and recorder 65 through line 67. The ratio computer and recorder is adapted to interpret and report the two voltage signals as the D.E. of the solution.

The ratio computer and recorder 65 is a conventional chart recording instrument of known construction having a pointer movable over a scale and over a continuously driven chart. The position of the pointer is controlled by the voltage received from the polarimeter 52 and the voltage received from the transducer 64 under the control of the density monitor 42.

An automatic cell cleansing system is also provided for removing by washing any film layers which may deposit on the surface of the cells or prisms of the polarimeter during operation. The cell cleansing system is periodically actuated by a wash cycle timer 61, which transmits an electrical impulse to solenoid 60 to provide an air pressure output signal to 3-way valves 54 and 50. The 3-way valves automatically close off circulation of the sample stream to the polarimeter and permit pumping of the cleansing solution from tank 57 by pump 58 through the polarimeter for a predetermined period of time. At the conclusion of the wash cycle valves 54 and 50 are repositioned to permit normal circulation of the sample stream through the polarimeter. One wash cycle every 24 hours is all that is normally required for maintaining an effective automatic monitoring system.

The cell-washing cleansing fluid is preferably a weak alkali solution, such as a 5% solution of sodium carbonate; however a mild acid solution, such as a 5% solution of hydrochloric acid may be used if desired.

Any process that has a product or reactant which is capable of exhibiting optical rotation as a liquid or as a solution may be monitored by the apparatus of this invention. For example, any of the more common sugars such as dextrose, galactose, lactose, maltose, levulose, mannose, sucrose, may be monitored. Dimers, trimers, tetramers, and higher polymers alone or in combination with the above sugars may also be measured or monitored by the apparatus of this invention.

A more complete list of materials which exhibit optical rotation as a liquid or in solution and which can be monitored by the apparatus and process of this invention may be found in the International Critical Tables, vol. VII (1930).

Although this invention may be used for monitoring a variety of materials in solution, this invention has particular application in the syrup and sugar industry. As was previously noted, the rate and degree of hydrolyzation of starches to syrups and sugars may be continually monitored by the apparatus and process of this invention.

A typical hydrolyzation process for which the apparatus and process of this invention may be used is described in United States Patent 2,359,763. This patent describes a continuous acid hydrolyzation process whereby a 11° Bé. starch liquor is acidified with about 0.017 pound per gallon of 18° Bé. hydrochloric acid at a pH of about 2.0. The acidified starch liquor is introduced into a vessel for pasting, heating, and converting the starch liquor to dextrose under a steam pressure of about 160 pounds and at a temperature of about 190° C. The converted liquor is neutralized with soda ash to a pH of about 5.0%. Dextrose equivalents ranging between 30% and 50% to as high as 88.8% can be obtained by this process. The rate and degree of conversion to dextrose can be altered by varying the amounts and concentration of acid used or by varying certain operating variables such as the temperature and pressure of the reaction. As the operating variables are altered, it is highly advantageous to have an immediate report as to the effect these changes had on the product produced.

In an atrticle published in Food Technology, volume 7, pp. 303–307 (1953), a starch hydrolyzation process is described whereby both acids and enzymes are used to produce a starch syrup. According to this article, a starch slurry of about 20° Bé. is acidified to a pH of about 1.8 and converted under a steam pressure of about 30–40 pounds to approximately a 50 D.E. The converted material is adjusted to a 4.8 pH, clarified, and evaporated to a 50% dry substance. This substrate is transferred to tanks where the pH is adjusted to about 5.5 and a temperature of 55° C. A solution of a fungal enzyme such as Hydralase (Jacques Wolff), Rhozyme S (Rohm and Haas), Mylase (Wallerstein), or Dextrinase (Takamine) is added to the extent of about 0.05% of the dry substance syrup and the conversion continued for about 48 hours until the desired D.E. is obtained. The D.E. may be monitored by the apparatus of this invention.

It will be appreciated that other conditions may be employed and that other specific makes of apparatus may be utilized without departing from the spirit and scope of this invention.

Example 1

In this example the monitoring apparatus diagrammatically shown in the accompanying illustration was tied into a starch hydrolyzation process to permit a representative sample of the starch hydrolyzate being produced to pass through the monitoring apparatus.

The crude syrup was continuously monitored by taking portions of the starch hydrolyzate and passing it through a pair of Ronningen-Petter filters (10 mesh) at a rate of 5.0 gallons per minute. The syrup was then pumped through a Doxie cyclone at a rate of 5.0 gallons per minute where 90% of the "mud" was removed overhead and recirculated to the surge tank. The relatively clean stream from the bottom of the Doxie cyclone was sent to a sample reservoir where the remainder of the "mud" was allowed to float to the surface and where it was continuously withdrawn by way of an overflow line to the flush tank. The clean crude syrup stream from the bottom of the sample reservoir was next pumped at a rate of 1.5 gallons per minute through a heat exchanger where the temperature was cooled from 200° F. to 140° F. prior to being circulated through the Halliburton density monitor. About ¾ of the discharge syrup stream from the Halliburton density monitor was returned to the surge tank through a bypass line. The remaining portion of the syrup stream was passed through another filter and then through the polarimeter at a rate of 600 cc. per minute. The syrup stream was then discharged as waste or returned to the surge tank.

The Halliburton density monitor employed in the above example had a 1¼″ diameter U-tube fabricated of 316 Stainless Steel for continuously measuring the specific gravity of the crude syrup circulated through it. The U-tube was attached to a null-balance servo system and supported by two special cross-spring pivots. Any change in syrup density was determined by the null-balance system and a proportional change was made in a nozzle-flapper relationship to continuously balance the U-tube. The range of the Halliburton density monitor was adjusted to a specific gravity span at 140° F. of 1.0900 to 1.1900 specific gravity units for an output signal change of 3–15 p.s.i. The 3–15 p.s.i. pneumatic signal was subsequently changed to a 0–5 millivolt signal with a Taylor transducer. This 0–5 millivolt signal was used as one input signal to the Phoenix ratio recorder.

A Du Pont polarimeter was used to measure the optical rotation of the circulating crude syrup stream. The polarimeter consisted of a mercury vapor lamp light source, a collimating lens, a primary polarizer to establish a reference point for measurement of the optical rotation, a sample cell through which a continuous stream of crude syrup was circulated at a constant temperature of 140° F., and a measuring circuit where the extent of optical rotation caused by the sample was determined and an output signal (0–10 millivolt) was issued. The polarimeter was adjusted to read optical rotation in the range of 0–19.0° arc full scale. It was provided with a standard cell attachment to periodically check the accuracy of its operation.

The Phoenix ratio recorder was used to receive individual 0–5 millivolt signals from the density monitor and polarimeter. These signals were recorded individually or the ratio of the two computed. The ratio of the optical rotation of a syrup to the specific gravity of that syrup minus the specific gravity of water at the same temperature was correlated to report a D.E. of between 35 to 65 and to record this D.E. range over an eleven inch full scale.

Table I below compares the D.E. equivalents obtained by the apparatus of this invention and that obtained by laboratory analysis utilizing the Lane-Eynon volumetric method described in A.O.A.C. (Association of Official Analytical Chemists), 10th edition, p. 494.

TABLE I

| Runs: | Monitored, Percent D.E. | Lab. Analysis, Percent D.E. |
| --- | --- | --- |
| 1 | 38.9 | 38.1 |
| 2 | 33.8 | 35.0 |
| 3 | 34.5 | 34.1 |
| 4 | 34.6 | 34.9 |
| 5 | 46.3 | 45.2 |
| 6 | 48.4 | 47.8 |
| 7 | 54.7 | 56.3 |
| 8 | 60.2 | 61.7 |

When the apparatus of this invention is calibrated for other starch hydrolyzates or for other materials exhibiting optical rotation, comparable results are obtained.

Since many embodiments of this invention may be made and since many changes may be made in the embodiments described, the foregoing is to be interpreted as illustrative only and my invention is defined by the claims appended hereto.

What is claimed as new is:

1. An apparatus for continuously measuring the equivalent concentration of an optically active material in a solution comprising a density measuring means adapted to provide a response that varies as a function of the specific gravity of the solution, a polarimeter means adapted to provide a response that varies as a function of the optical rotation of the solution, a means for circulating the solution through the density measuring means and the polarimeter means, and a computation means for combining the responses from the density measuring means and the polarimeter means into a result which is a ratio of the response from the density measuring means and the polarimeter means to give the equivalent concentration of the optically active material in solution.

2. The apparatus of claim 1 wherein said apparatus includes a means for causing the solution to flow through the polarimeter means at predetermined rates and at predetermined temperatures.

3. The apparatus of claim 2 wherein said apparatus is provided with a bypass means for permitting a portion of the solution from the density measuring means to flow through the polarimeter means.

4. The apparatus of claim 3 wherein said apparatus is provided with a clarifying means upstream of said polarimeter means for removing solids from said solution.

5. The apparatus of claim 4 wherein the density measuring means, the polarimeter means, and the computation means, having a recording means, are calibrated to report the sugar concentration of a starch hydrolyzate as a D.E. value.

6. An apparatus for continuously monitoring and measuring the dextrose equivalent value of a starch hydrolyzate comprising (a) filtering means for filtering out large foreign particles from said starch hydrolyzate, (b) polarimeter means for measuring the optical rotation of the starch hydrolyzate, (c) density measuring means for measuring the specific gravity of starch hydrolyzate, (d) circulating means for circulating the starch hydrolyzate through (a), (b) and (c), (e) conversion means for converting the measurements of the polarimeter means and the density measuring means into an electric impulse, (f) ratio recording means for computing and recording the response of the polarimeter means and the density measuring means as a function of the dextrose equivalent value, (g) flow controlling means for controlling the rate of flow of the starch hydrolyzate through the polarimeter means and density measuring means and (h) temperature controlling means for adjusting and maintaining the temperature of the starch hydrolyzate passing through the polarimeter means and density measuring means at a predetermined temperature.

7. A method for obtaining equivalent concentration of a material that is capable of optical rotation in a solution which comprises measuring the specific gravity of the solution, measuring the optical rotation of the solution, and computing the ratio therebetween, and reporting said computation as the equivalent concentration of the material in solution.

8. The method of claim 7 wherein the measurements are carried out on a continuous and simultaneous basis.

9. The method of claim 8 wherein the measurements are carried out with the solution maintained at a predetermined temperature and at a predetermined rate of flow.

10. The method of claim 9 wherein the solution that is capable of optical rotation is a starch hydrolyzate.

References Cited
UNITED STATES PATENTS

| | | | |
|---|---|---|---|
| 2,877,683 | 3/1959 | Fischer | 88—14 |
| 3,074,277 | 1/1963 | Hill | 73—53 X |
| 3,090,222 | 5/1963 | Akaboshi et al. | 73—53 |

S. CLEMENT SWISHER, *Primary Examiner.*

J. W. ROSKOS, *Assistant Examiner.*

UNITED STATES PATENT OFFICE
CERTIFICATE OF CORRECTION

Patent No. 3,411,342                                               November 19, 1968

Theodore F. Liermann

It is certified that error appears in the above identified patent and that said Letters Patent are hereby corrected as shown below:

Column 4, line 67, "5.0%" should read -- 5.0 --. Column 6, line 4, "0-19.0°" should read -- 0-18.0° --.

Signed and sealed this 10th day of March 1970.

(SEAL)
Attest:

Edward M. Fletcher, Jr.                                WILLIAM E. SCHUYLER, JR.
Attesting Officer                                              Commissioner of Patents